(12) United States Patent
Temple-Wilson et al.

(10) Patent No.: US 6,173,972 B1
(45) Date of Patent: Jan. 16, 2001

(54) LOCKING CHUCK

(75) Inventors: Richard E. Temple-Wilson, South Yorkshire; Ian Middleton, Chesterfield, both of (GB)

(73) Assignee: Power Tool Holders, Inc., Christiana, DE (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/334,478

(22) Filed: Jun. 16, 1999

(51) Int. Cl.[7] ..................................................... B23B 31/12
(52) U.S. Cl. ............................. 279/62; 279/150; 279/902
(58) Field of Search ................................ 279/60–65, 150, 279/902; 408/240

(56) References Cited

U.S. PATENT DOCUMENTS

| | | | |
|---|---|---|---|
| 3,237,955 | * 3/1966 | McCarthy et al. | 279/63 |
| 3,325,166 | 6/1967 | McCarthy et al. . | |
| 3,506,277 | * 4/1970 | Harms | 279/902 |
| 3,545,776 | * 12/1970 | Haviland | 279/63 |
| 4,277,074 | 7/1981 | Kilberis . | |
| 4,317,578 | 3/1982 | Welch . | |
| 4,323,324 | 4/1982 | Eberhardt . | |
| 4,358,230 | 11/1982 | Rohlin . | |
| 4,389,146 | 6/1983 | Coder . | |
| 4,395,170 | * 7/1983 | Clarey | 279/62 |
| 4,460,296 | 7/1984 | Sivertson, Jr. . | |
| 4,498,682 | * 2/1985 | Glore | 279/60 |
| 4,526,497 | 7/1985 | Hatfield . | |
| 4,536,113 | 8/1985 | Hatfield . | |
| 4,621,820 | 11/1986 | Rohm . | |
| 4,627,627 | 12/1986 | Rohm . | |
| 4,627,628 | 12/1986 | Rohm . | |
| 4,669,932 | 6/1987 | Hartley . | |
| 4,682,918 | 7/1987 | Palm . | |
| 4,700,956 | 10/1987 | Rohm . | |
| 4,703,942 | 11/1987 | Rohm . | |
| 4,915,555 | 4/1990 | Smothers . | |
| 4,955,623 | 9/1990 | Rohm . | |
| 4,958,840 | 9/1990 | Palm . | |
| 4,968,191 | 11/1990 | Palm . | |
| 4,991,860 | 2/1991 | Rohm . | |
| 5,011,343 | 4/1991 | Saban et al. . | |
| 5,171,030 | 12/1992 | Rohm . | |
| 5,195,760 | 3/1993 | Wheeler et al. . | |
| 5,236,206 | 8/1993 | Rohm . | |
| 5,531,549 | 7/1996 | Fossella . | |
| 5,624,125 | 4/1997 | Rohm . | |
| 5,820,136 | 10/1998 | Han et al. . | |
| 5,882,153 | * 3/1999 | Mack et al. | 279/62 |
| 5,927,914 | * 7/1999 | Mack et al. | 279/62 |
| 6,007,071 | * 12/1999 | Middleton | 279/62 |

* cited by examiner

*Primary Examiner*—Steven C. Bishop
(74) *Attorney, Agent, or Firm*—Nelson Mullins Riley & Scarborough, L.L.P.

(57) ABSTRACT

A driver includes a housing, a driveshaft rotatable with respect to the housing and a chuck. The chuck includes a generally cylindrical body and a nut rotatably mounted relative to the body so that relative rotation between the nut and the body moves the chuck toward an open or closed position. A first sleeve is rotationally fixed to the nut and is axially movable and rotatable with respect to the body. A collar is disposed operatively between the first sleeve and the body. The collar is rotationally fixed to and axially movable with respect to the body and is axially fixed to and rotatable with respect to the first sleeve so that the collar moves axially with the first sleeve and with respect to the body between a first axial position and a second axial position. The collar is rotatable with respect to the housing in the first position and is rotationally fixed to the housing in the second position.

45 Claims, 6 Drawing Sheets

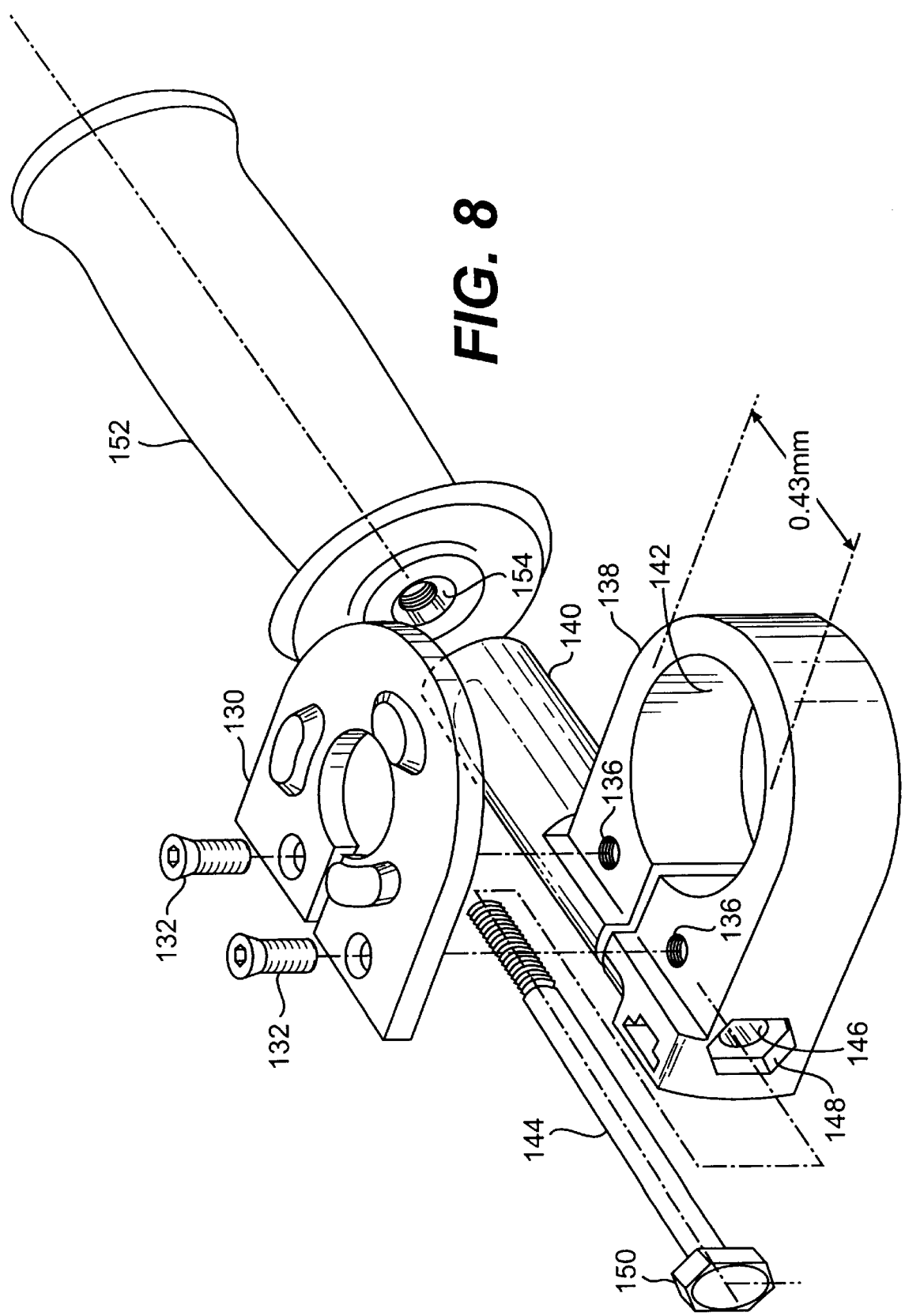

LOCKING CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand.

Both hand and electric or pneumatic tool drivers are well known. Although twist drills are the most common tools on such drivers, the tools may also comprise screwdrivers, nut drivers, burrs, mounted grinding stones, and other cutting or abrading tools. Since the tool shanks may be of varying diameter or of polygonal cross-section, the device is usually provided with a chuck that is adjustable over a relatively wide range. The chuck may be attached to the driver by a threaded or tapered bore or any other suitable means.

A variety of chuck types have been developed in which a gripping mechanism is actuated by relative rotation between a chuck body and a sleeve. In an oblique jawed chuck, for example, a body member includes three passageways disposed approximately 120° apart from each other. The passageways are configured so that their center lines meet at a point along the chuck axis forward of the chuck body. The gripping mechanism includes three jaws constrained by and movable in the passageways to grip a cylindrical tool shank disposed approximately along the chuck's center axis. The gripping mechanism also includes a nut that rotates about the chuck's center and engages threads on the jaws so that rotation of the nut moves the jaws in either direction in the passageways. The body is attached to the driveshaft of a driver and is configured so that rotation of the body in one direction with respect to the nut forces the jaws into a gripping relationship with the tool shank, while rotation in the opposite direction releases the gripping relationship. Such a chuck may be keyless if it is rotated by hand. One example is disclosed in U.S. Pat. No. 5,125,673 entitled "Non-Impact Keyless Chuck," commonly assigned to the present assignee and the entire disclosure of which is incorporated by reference herein.

Various configurations of keyless chucks are known in the art and are desirable for a variety of applications. Keyless chucks actuated by relative rotation between a sleeve and a chuck body generally include means to control the rotational position of the sleeve and the body. For example, a first sleeve may be provided in communication with a nut as described above while a second sleeve, which is independent of the first sleeve, may be attached to the body. Thus, a user may rotate the first sleeve with one hand while gripping the second sleeve with the other hand, thereby holding the body still. Alternatively, in some devices in which only a single sleeve is provided, a user may grip the single sleeve and actuate the tool driver to rotate the spindle, thereby rotating the chuck body with respect to the sleeve. In addition, a mechanism may be located in the driver to lock the spindle of the driver when the driver is not actuated, thus enabling use of a single sleeve chuck.

SUMMARY OF THE INVENTION

The present invention recognizes and addresses the forgoing considerations, and others, of prior art constructions and methods.

Accordingly, it is an object of the present invention to provide an improved chuck.

This and other objects are achieved by a chuck for use with a manual or power driver having a housing and a drive shaft rotatable with respect to the housing. The chuck includes a generally cylindrical body having a forward section and a rearward section. The rearward section has an axial bore formed therein to mate with the driveshaft of the driver. A nut is rotatably mounted relative to the body so that relative rotation between the nut and the body moves the chuck toward an open or closed position, depending upon the direction of the relative rotation. A first sleeve is rotationally fixed to the nut and is rotatable and axially movable with respect to the body. A collar is disposed operatively between the first sleeve and the body. The collar is rotationally fixed to and axially movable with respect to the body. It is axially fixed to and rotatable with respect to the first sleeve so that the collar moves axially with the first sleeve with respect to the body between a first axial position and a second axial position. The collar is rotatable with respect to the housing in the first position and is rotationally fixed to the housing in the second position.

A manual or powered driver may include a housing and a drive shaft rotatable with respect to the housing. The driver includes a chuck having a generally cylindrical body with a forward section and a rearward section. The rearward section has an axial bore formed therein to mate with the drive shaft of the driver. A nut is rotatably mounted relative to the body so that relative rotation between the nut and the body moves the chuck toward an open or closed position, depending on the direction of the relative rotation. A first sleeve is rotationally fixed to the nut and is rotatable and axially movable with respect to the body. A collar is disposed operatively between the first sleeve and the body. The collar is rotationally fixed to and is axially movable with respect to the body. It is axially fixed to and rotatable with respect to the first sleeve so that the collar moves axially with the first sleeve with respect to the body between a first axial position and a second axial position. The collar is rotatable with respect to the housing in the first position and is rotationally fixed to the housing in the second position.

Other objects, features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which:

FIG. 8 is a partial exploded view of a tool driver in accordance with an embodiment of the present invention.

Figure 1:
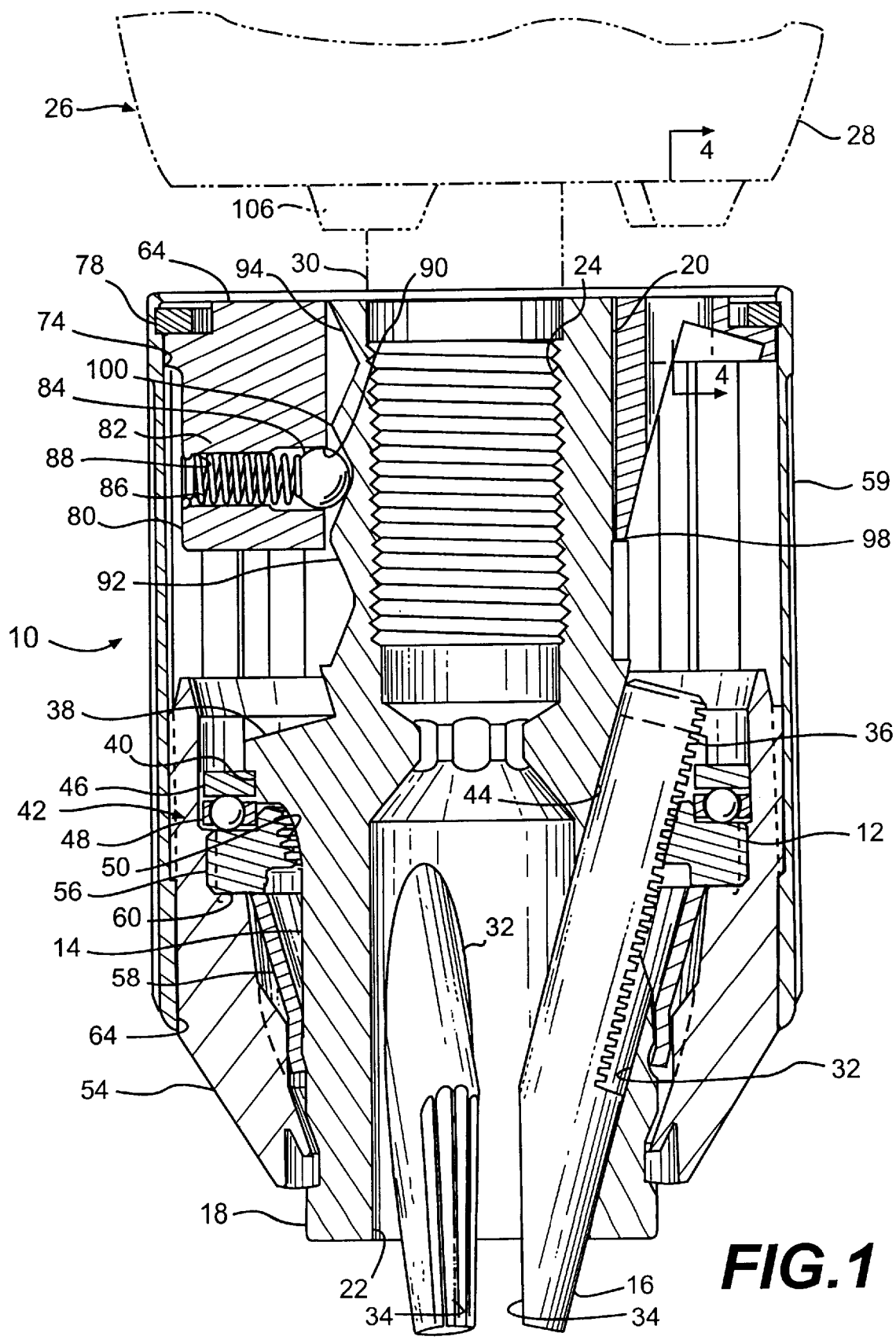
FIG. 1 is a longitudinal cross-sectional view of a chuck with a tool driver in accordance with an embodiment of the present invention.

Repeat use of reference characters in the present specification and drawings is intended to represent the same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring to the figures, a presently preferred embodiment of the present invention is illustrated in the form of an oblique jawed chuck. It should be understood, however, that this illustration is provided by way of explanation of the invention only and that the invention is applicable to any suitable chuck that is opened or closed through relative rotation between a nut and a chuck body. Referring to FIG. 1, for example, a chuck 10 includes a nut 12 that rotates with respect to a chuck body 14. In this embodiment, rotation of nut 12 drives jaws 16 in a forward or rearward direction, depending on the nut's rotational direction, to thereby open or close the chuck.

Body 14 is generally cylindrical in shape and includes a nose or forward section 18 and a tail or rearward section 20. An axial bore 22 is formed in the nose section and is dimensioned somewhat larger than the largest tool shank that the chuck is designed to accommodate. A threaded bore 24 is formed in tail section 20 and is of a standard size to mate with the drive shaft of a powered or hand driver (indicated in phantom at 26), for example a power tool having a housing 28 and a spindle 30. While a threaded bore 24 is illustrated, such bore could be replaced with a tapered bore of a standard size to mate with a tapered drive shaft or with any other suitable connection mechanism. A central region of body 14 may be formed with a socket to accept a drive bit so that the body may be screwed onto the spindle by the bit. Such a socket configuration is described in U.S. Pat. No. 5,193, 824, incorporated herein by reference.

Passageways 32 are formed in body 14 to accommodate each jaw 16. The chuck has three jaws, and each jaw is separated from the adjacent jaw by an arc of approximately 120°. The axes of the passageways 32 and the jaws 16 are angled with respect to the chuck axis and intersect the chuck axis at a common point ahead of chuck body 14. Each jaw 16 has a tool engaging portion 34, which is generally parallel to the chuck body 14, and threads 36 on its opposite or outer surface. Threads 36 may be constructed in any suitable type and pitch.

Figure 3:
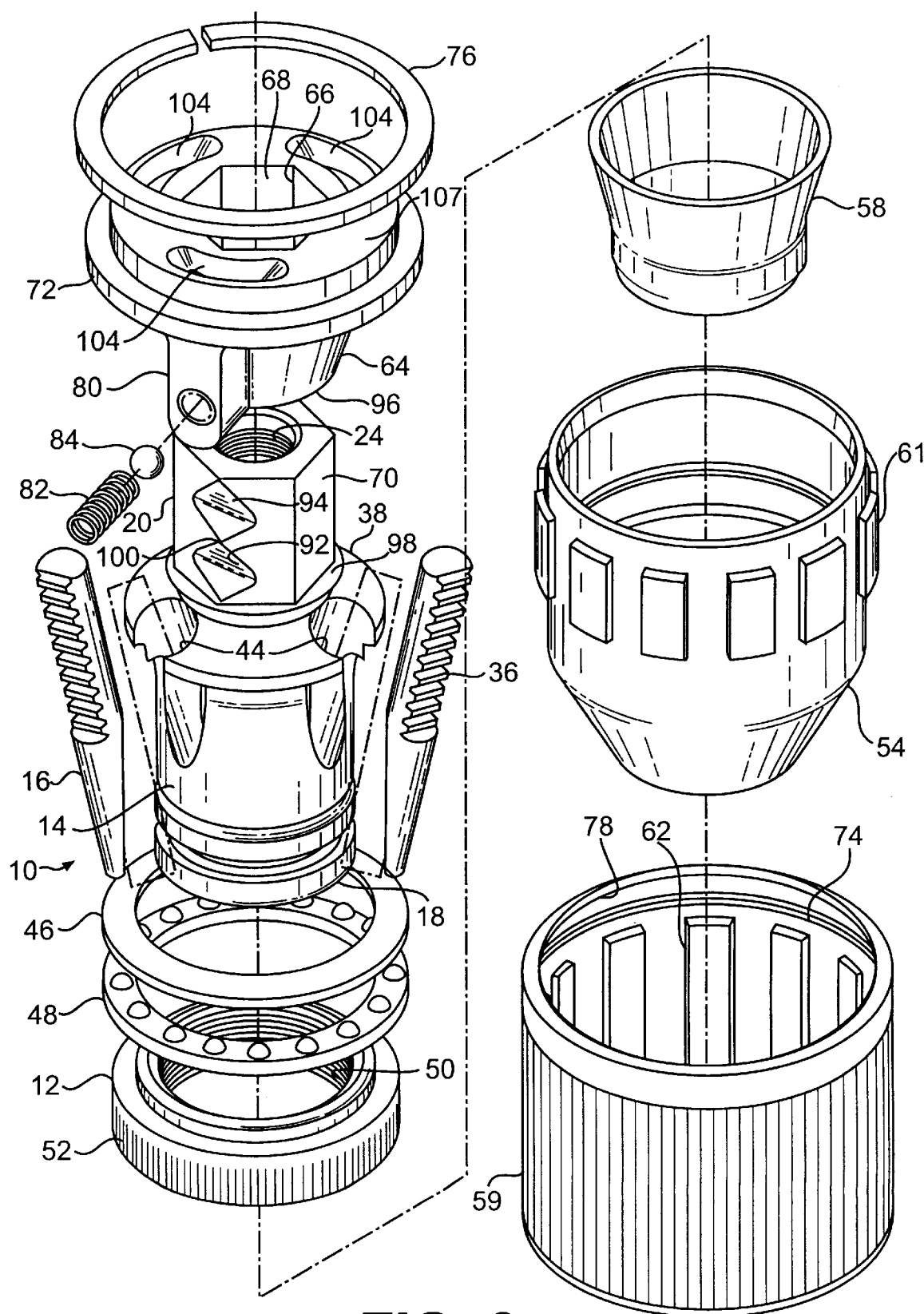
FIG. 3 is an exploded view of a chuck in accordance with an embodiment of the present invention.

As illustrated in FIGS. 1 and 3, body 14 includes a thrust ring 38 which, in a preferred embodiment, may be integral with the body. In an alternate embodiment, thrust ring 38 may be a separate component from the body member. Thrust ring 38 may also include a ledge portion 40 to receive a bearing assembly 42, as well as a plurality of jaw guideways 44 formed around its circumference to permit retraction of jaws 16 therethrough. In the embodiment illustrated in FIGS. 1 and 3, bearing assembly 42 includes a washer 46 and a caged roller bearing 48.

Nut 12 is a one piece nut that includes threads 50 for mating with threads 36 on jaws 16. The outer surface of nut 12 is knurled at 52 so that the nut may be pressed to a driving sleeve 54 at 56. Nut 12 therefore rotates with driving sleeve 54 about body 14.

An outer sleeve 59 is disposed about driving sleeve 54 and is rotationally fixed thereto by interengaging axially aligned splines 61 and 62 on the driving sleeve and outer sleeve, respectively. The splines permit the outer sleeve to move axially relative to the driving sleeve, and a lip 64 is provided at the front end of outer sleeve 59 to limit rearward axial movement of the outer sleeve with respect to the driving sleeve.

The outer circumferential surface of sleeve 59 may be knurled or may be provided with longitudinal ribs or any other configuration to enable a user to grip it securely. Sleeves 54 and 59 may be fabricated from a structural plastic such as polycarbonate, a filled polypropylene, for example glass filled polypropylene, or a blend of structural plastic materials. Other composite materials such as, for example, graphite filled polymerics may be suitable in certain environments. In one embodiment, the sleeve is constructed from a 30% glass filled nylon 66 material. As would be appreciated by one skilled in the art, the materials for which the chuck of the present invention is fabricated will depend on the end use of the chuck, and the above are provided by way of example only.

Nut 12 is disposed between thrust ring 38 and a retaining ring 58 and axially secures sleeve 54 with respect to the body. Retaining ring 58 is an annular cone that is pressed onto forward section 18 of body 14 and engages nut 12 at a front surface 60 thereof.

Since jaws 16 are rotationally fixed with respect to the body within passageways 32, rotation of nut 12 by sleeves 54 and 59 moves jaws 16 axially through the passageways due to the engagement of the nut threads and jaw threads. The direction of axial movement of the jaws depends on the rotational direction of the sleeves and nut with respect to the body. If a tool, such as drill bit, is inserted into bore 22, the sleeves and nut may be rotated so that the jaws move toward a closed position wherein tool engaging portions 34 grippingly engage the tool. Rotation in the opposite direction moves the jaws axially rearward out of the closed position toward an open position.

Through most of the chuck's range of operation, spindle 30 and chuck body 14 remain still as the nut rotates about them. In a typical driver such as drill 26, however, spindle 30 is not locked in position unless the driver is activated. Thus, when the chuck nears its fully opened or fully closed position, frictional forces in chuck 10 may turn the chuck body and spindle with the sleeve and nut, thereby inhibiting the user from fully opening or closing the chuck. Accordingly, a locking mechanism is provided to rotationally fix body 14 to drill housing 28 during rotation of nut 12.

The locking mechanism includes an annular collar 64 mounted on rearward section 20 of body 14. A central bore 66 extends through collar 64 and defines six flats 68 that mate with corresponding flats 70 on rear body section 20 to rotationally fix collar 64 with respect to the body. Collar 64 includes an annular rim 72 that extends radially outward from the collar and is received by an annular groove in the interior surface of outer sleeve 59. The annular groove is formed between a shoulder 74 and a spring clip 76 that is in turn received in an annular groove 78. Rim 72 is rotatable within the groove formed between shoulder 74 and spring clip 76. Thus, collar 64 is rotatable with respect to sleeve 59 but is axially fixed thereto.

A detent maintains collar 64 in its axial position with respect to body 14 and includes a bushing 80, a compression spring 82 and a ball 84. Spring 82 is received in a bore 86 extending through bushing 80 so that one end of the spring abuts a shoulder 88 in the bushing, and the other end pushes ball 84 against a restricted opening 90 at the bushing's opposite end. Thus, ball 84 extends radially inward into collar bore 66 into either of two grooves 92 and 94 in rear body section 20. While the bushing in the illustrated embodiment is integrally formed with the roller, it should be understood that they may be separate pieces. For example, a cylindrical bushing may thread into a bore extending radially through the collar so that ball 84 extends into bore 66. Furthermore, the detent could be attached to and extend radially inward from sleeve 59 to engage the chuck body.

In FIG. 1, outer sleeve 59 and collar 64 are in an axially forward position with respect to the body, so that ball 84 extends into groove 92. Further axial movement of collar 64 and outer sleeve 59 in the forward direction is prevented by a forward edge 96 of collar 64 that abuts a rearward facing shoulder 98 of body 14. Rearward axial movement is restrained by ball 84, which abuts a shoulder 100 between grooves 92 and 94.

Figure 2:
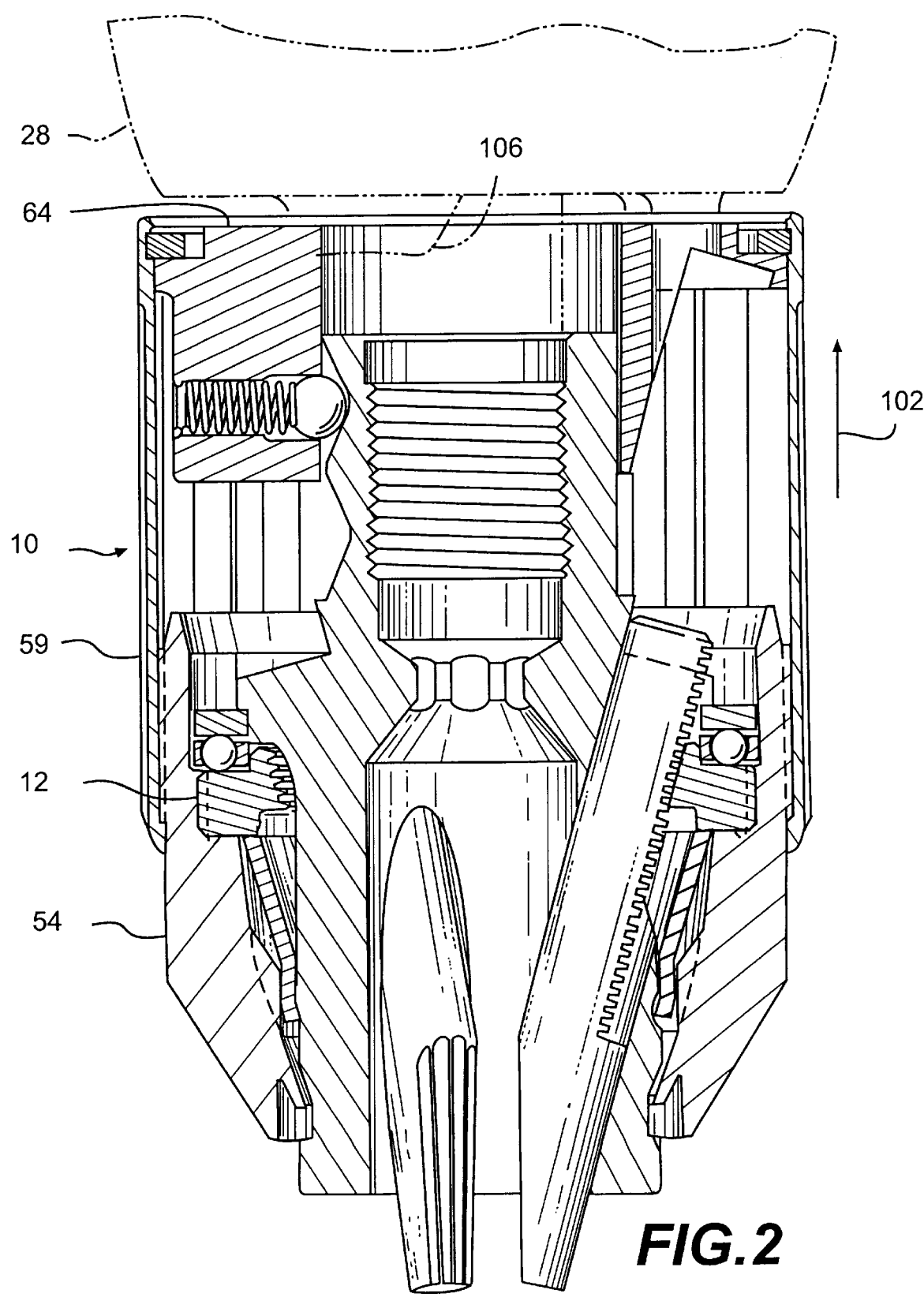
FIG. 2 is a longitudinal cross-sectional view of a chuck with a tool driver in accordance with an embodiment of the present invention.

Referring to FIG. 2, however, a user may move outer sleeve 59 and collar 64 rearward by pushing the sleeve back with sufficient force to overcome the detent, as indicated by the arrow at 102. That is, sufficient force is provided so that ball 84 rides over shoulder 100 and into groove 94 against the force of spring 82.

Figure 5:
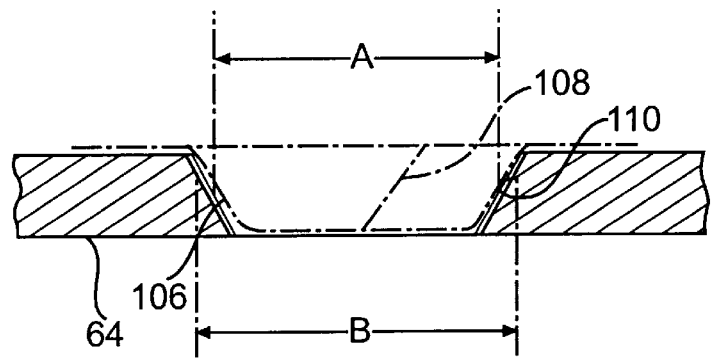
FIG. 5 is a partial cross-sectional view of the collar as in FIG. 4.
Figure 6:
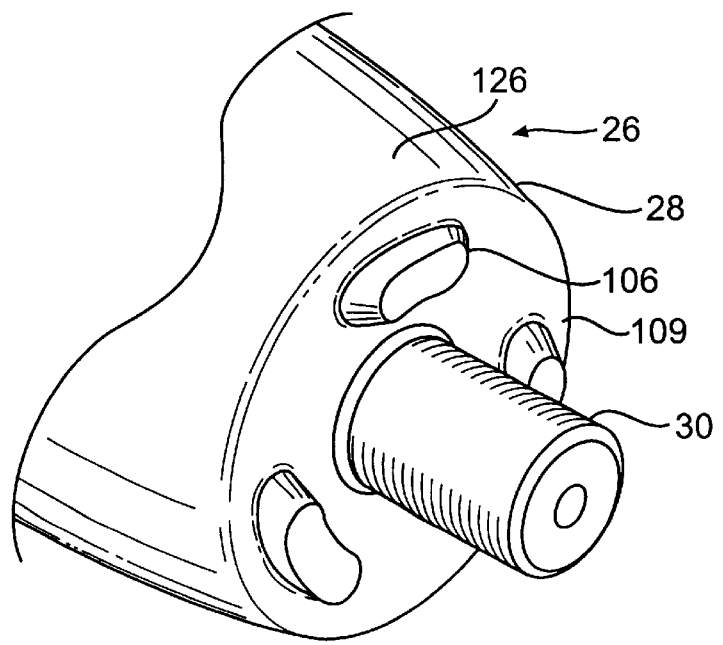
FIG. 6 is a partial perspective view of a tool driver in accordance with an embodiment of the present invention.

Referring to FIG. 3, collar 64 includes 3 gaps 104 spaced equiangularly about a rearward facing surface 107 and that extend axially into the collar. Referring also to FIG. 6, housing 28 defines 3 equiangularly spaced lugs 106 that extend axially forward from a forward face 108 of housing 28. When sleeve 59 and collar 64 are pushed to their rearward position as shown in FIG. 2, gaps 104 receive respective lugs 106 as shown in FIG. 5. Thus, in this position, collar 64 is rotationally fixed to housing 28. Since the collar is also rotationally fixed to chuck body 14, the body is rotationally fixed to the drill housing. Subsequent rotation of sleeve 59 about collar 64 and body 14 therefore rotationally drives nut 12 to open or close the chuck.

Figure 4:
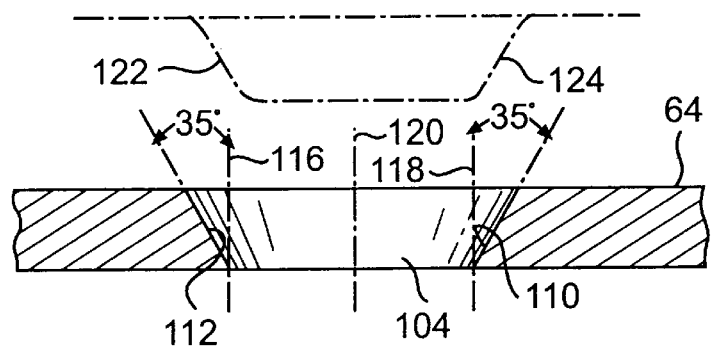
FIG. 4 is a partial cross-sectional view of a collar for use with a chuck according to an embodiment of the present invention.

Referring to FIG. 4, the angular width of gap 104 decreases from an end of the gap proximate the lug to the gap's opposite end. Specifically, the gap's angular sides 110 and 112 are slanted with respect to lines 116 and 118 parallel to the gap's axis 120. In one preferred embodiment, the angle of the sides to these lines is approximately 35°. Corresponding angular sides 122 and 124 are also slanted so that they are substantially parallel to sides 112 and 110, respectively, when collar 64 is in the rearward position as shown in FIG. 5.

In the illustrated embodiment, the width A (which may be described in terms of linear distance, arcuate distance or angular distance) of lug 106 is only slightly less than the width B of gap 104 at the corresponding level. As indicated in phantom at 108, however, lugs 106 in one preferred embodiment have a substantially smaller width than gaps 104 (for example where A:B is approximately 1:1.5) to facilitate location of the lugs in the gaps. When the chuck is near its closed position, and the user rotates sleeve 59 while pushing rearwardly, collar 64 rotates until lugs 106 engage the gaps. Further rotation of sleeve 59 continues to rotate collar 64 until angular side edge 108 of lug 106 abuts angular side edge 110 of gap 104. At this point, rotation of collar 64, and therefore body 14, stops, and further rotation of the sleeve rotates nut 12 with respect to the body to open or close the chuck.

The slanted sides of the lugs and gaps creates a clutch that inhibits over tightening. When collar 64 is pushed back to its rearward position and sleeve 59 and nut 12 are rotated to the chuck's fully opened position or fully closed position, the nut can no longer drive jaws 16 axially in the passageways, and a greater rotational force is applied to the body from sleeve 59. The slanted sides of the gaps and lugs allows this force to push the gap sides over the lug sides, thereby pushing collar 64 forward against the detent force so that ball 84 passes over shoulder 100 into groove 92. As shown in FIG. 1, the collar in this position is disengaged from the lugs. The magnitude of the rotational force necessary to drive the collar forward is affected by the degree to which the sides of the lugs, gaps and shoulder 100 are slanted, as well as the compression force of spring 82.

Furthermore, the clutch pushes collar 64 forward if the user activates the spindle without pushing sleeve 59 and collar 64 to the forward position. Specifically, the spindle's activation rotates body 14 and collar 64 with respect to drill housing 28. This pushes the angular sides of gaps 104 over lugs 106, thereby pushing sleeve 59 and collar 64 to the forward position.

It should be understood that the construction illustrated in the figures is but one preferred embodiment of the present invention. For example, the position of the lugs and gaps may be reversed so that lugs 106 extend rearwardly from collar 64 and gaps 104 are defined in the face of the drill housing. Furthermore, the gaps and lugs may be formed in any suitable manner, for example, including interengaging teeth formed on the opposing forward and rearward surfaces 107 and 109 or about an outer circumferential surface 126 (FIG. 6) of housing 28 and a rearwardly facing surface of collar 64. In addition, collar 64 may include an annular extension that defines radially inwardly extending gaps and/or lugs that engage radially outwardly extending gaps and/or lugs on outer surface 126.

Figure 7:
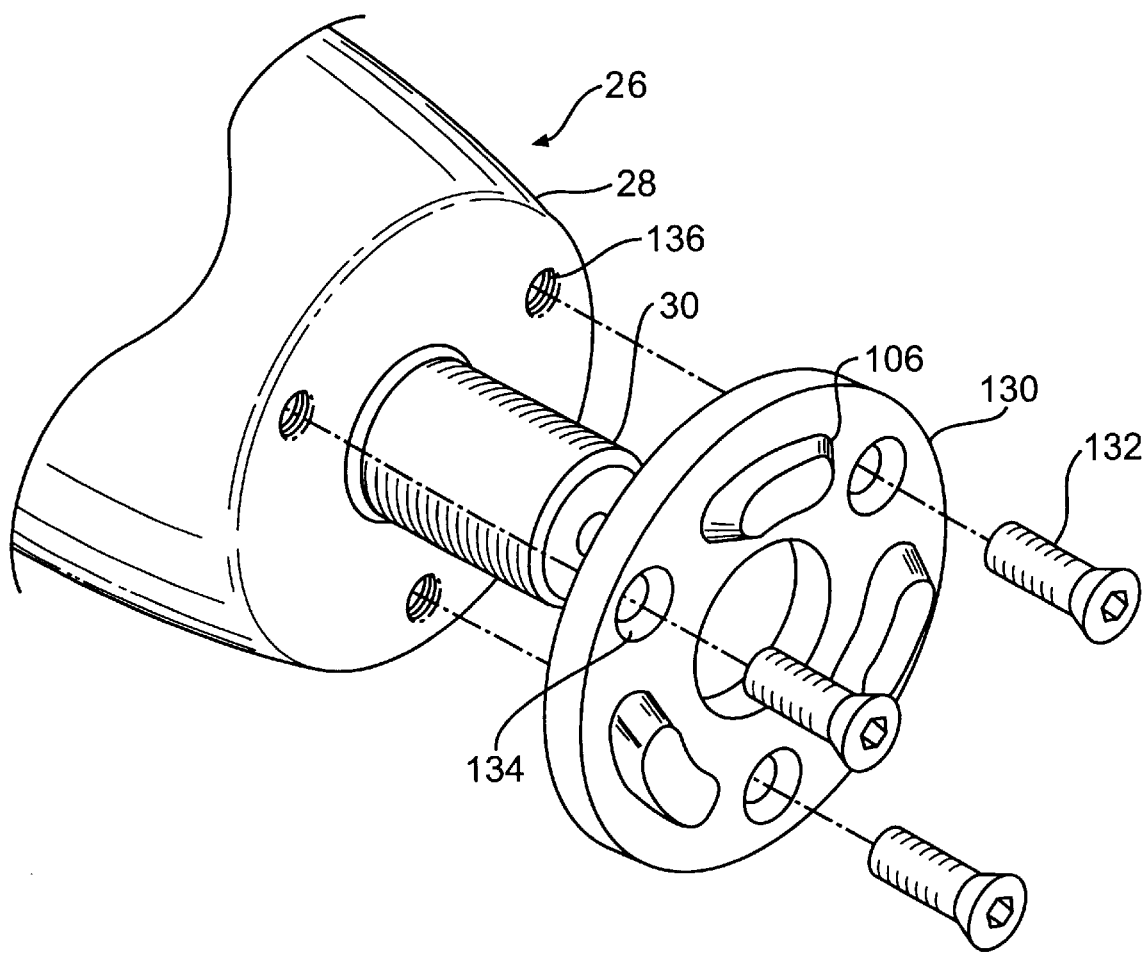
FIG. 7 is a partial exploded view of a tool driver in accordance with an embodiment of the present invention.

In a still further preferred embodiment of the present invention shown in FIG. 7, lugs 106 are defined on an annular plate 130 disposed about spindle 30 and attached to a main section of housing 28 at threaded bores 136 by screws 132 extending through respective holes 134. Thus, plate 130 may be employed to retrofit a driver 26 for use with a chuck 10 (FIGS. 1 through 6). Of course, as indicated above, the lugs may be formed integrally with the main part of housing 28.

Referring also to FIG. 8, a U-shaped plate 138 may be disposed between plate 130 and the drill housing so that plate 130 is attached to plate 138 by screws 132. Alternatively, plates 130 and 138 may be formed by a single plastic molded piece.

Plates 130 and 138 define a central bore 142 that is received over a collar (not shown) that surrounds the spindle. A bolt 144 extends through a transverse bore 146 in plate 138. Bore 146 defines a hexagonal first end 148 that mates with a hexagonal end 150 of bolt 144 so that bolt 144 is rotationally fixed within the bore. A gripping handle 152 abuts a handle member 140 extending from plate 138 and defines a threaded bore 154 that receives a threaded end of bolt 144. Rotation of handle 152 in a tightening direction draws bolt 144 into bore 154 and compresses the ends of U-shaped plates 138 and 130 together to tighten the plate onto the collar. Handle 152 may thereafter be gripped by an operator during use of the driver.

Still further, where a clutch is not provided between the lugs and gaps, a spring, for example a coil spring or a wave spring, may be disposed between collar 64 and body 14 to forwardly bias the collar. To move the collar to the rearward position, a user pushes sleeve 59 back against the force of the spring until the lugs engage the gaps. Upon release of the sleeve, the spring pushes the collar and sleeve back to the forward position. In such a configuration, a detent may be omitted. The collar may define a rearward facing shoulder opposite a forward facing shoulder on the body. The spring is disposed between the shoulders to bias the collar in a forward direction.

While one or more preferred embodiments of the invention have been described above, it should be understood that any and all equivalent realizations are included within the scope and spirit thereof. The embodiments depicted are presented by way of example only and are not intended as limitations upon the present invention. Thus, it should be understood by those skilled in this art that the present invention is not limited to these embodiments since modifications can be made. Therefore, it is contemplated that any and all such embodiments are included in the present invention as may fall within the literal or equivalent scope of the appended claims.

What is claimed is:

1. A chuck for use with a manual or powered driver having a housing and a drive shaft rotatable with respect to said housing, said chuck comprising:
    a generally cylindrical body, said body having a forward section and a rearward section, said rearward section having an axial bore formed therein to mate with said drive shaft of said driver;
    a nut rotatably mounted relative to said body so that relative rotation between said nut and said body moves said chuck toward an open or closed position, depending upon the direction of said relative rotation;
    a first sleeve rotationally fixed to said nut and rotatable and axially movable with respect to said body; and
    a collar disposed operatively between said first sleeve and said body, said collar being rotationally fixed to and axially movable with respect to said body and axially fixed to and rotatable with respect to said first sleeve so that said collar moves axially with said first sleeve with respect to said body between a first axial position and a second axial position,
    wherein said collar is rotatable with respect to said housing in said first position and is rotationally fixed to said housing in said second position.

2. The chuck as in claim 1, wherein said collar defines spaced apart gaps or spaced apart lugs that interengage with the other of spaced apart gaps and spaced apart lugs on said housing when said collar is in said second position.

3. The chuck as in claim 2, wherein said collar defines a plurality of spaced apart gaps extending axially into said collar so that when said collar is in said second position, said gaps respectively receive a plurality of lugs extending axially forward from said housing toward said collar.

4. The chuck as in claim 1, including a detent axially fixed to one of said first sleeve and said collar,
    wherein said detent engages said body when said collar is in said first position so that said collar is axially movable with respect to said body toward said second position upon application of an axial force between said collar and said body overcoming said detent, and wherein said detent engages said body when said collar is in said second position so that said collar is axially movable with respect to said body toward said first position upon application of an axial force between said collar and said body overcoming said detent.

5. The chuck as in claim 4, wherein said detent engages a first groove defined in said body when said collar is in said first position and wherein said detent engages a second groove defined in said body when said collar is in said second position.

6. The chuck as in claim 5, wherein said detent includes a bushing extending through said collar and defining an internal bore, wherein a biasing spring and a ball are disposed in said bore of said bushing so that said spring biases said ball to an opening of said bore in said bushing that has a diameter less than the diameter of said ball, and wherein said ball extends into said first groove when said collar is in said first position and extends into said second groove when said collar is in said second position.

7. The chuck as in claim 1, including a second sleeve disposed between, and rotationally fixed to each of, said first sleeve and said nut.

8. The chuck as in claim 7, wherein said second sleeve and said first sleeve are rotationally fixed to each other through interengaging axially aligned splines.

9. The chuck as in claim 1, wherein said nut is an annular one-piece member surrounding said body and retained in the axially forward direction on said body by an annular retainer attached to said nose section of said body and abutting an axially forward surface of said nut.

10. The chuck as in claim 7, wherein said second sleeve is pressed to said nut.

11. The chuck as in claim 2, wherein each said gap defines angular side surfaces that are slanted so that the angular width of said gap decreases from an end of said gap proximate said lug to an opposite end of said gap and so that, when said gaps receive said lugs, each said angular side surface is substantially parallel to an opposing angular side surface of a said lug received by said gap.

12. The chuck as in claim 11, wherein each said angular side surface of said gap defines an approximately 35° angle with respect to a line parallel to an axis of said gap.

13. The chuck as in claim 1, wherein said collar defines a central bore including at least one flat surface opposing a corresponding flat surface of said body to thereby rotationally fix said collar to said body.

14. A chuck for use with a manual or powered driver having a housing and a drive shaft rotatable with respect to said housing, said chuck comprising:
    a generally cylindrical body, said body having a forward section and a rearward section, said rearward section having an axial bore formed therein to mate with said drive shaft of said driver and said forward section having an axial bore formed therein and a plurality of angularly disposed passageways formed therethrough and intersecting said forward section axial bore;
    a plurality of jaws slidably respectively positioned in each of said angularly disposed passageways, each of said jaws having a jaw face formed on one side thereof and threads formed on the opposite side thereof;
    a nut rotatably mounted relative to said body and engaging said jaws so that relative rotation between said nut and said body operates said jaws;
    a first sleeve rotationally fixed to said nut and rotatable and axially movable with respect to said body; and
    a collar disposed operatively between said first sleeve and said body, said collar being rotationally fixed to and axially movable with respect to said body and axially fixed to and rotatable with respect to said first sleeve so that said collar moves axially with said first sleeve with respect to said body between a first axial position and a second axial position, wherein said collar is rotatable with respect to said housing in said first position and is rotationally fixed to said housing in said second position.

15. The chuck as in claim 14, wherein said collar defines spaced apart gaps or spaced apart lugs that interengage with the other of spaced apart gaps and spaced apart lugs on said housing when said collar is in said second position.

16. The chuck as in claim 15, wherein said collar defines a plurality of spaced apart gaps extending axially into said collar so that when said collar is in said second position, said gaps respectively receive a plurality of lugs extending axially forward from said housing toward said collar.

17. The chuck as in claim 14, including a detent axially fixed to one of said first sleeve and said collar, wherein said detent engages said body when said collar is in said first position so that said collar is axially movable with respect to said body toward said second position upon application of an axial force between said collar and said body overcoming said detent, and wherein said detent engages said body when said collar is in said second position so that said collar is axially movable with respect to said body toward said first position upon application of an axial force between said collar and said body overcoming said detent.

18. The chuck as in claim 17, wherein said detent engages a first groove defined in said body when said collar is in said first position and wherein said detent engages a second groove defined in said body when said collar is in said second position.

19. The chuck as in claim 18, wherein said detent includes a bushing extending through said collar and defining an internal bore, wherein a biasing spring and a ball are disposed in said bore of said bushing so that said spring biases said ball to an opening of said bore in said bushing that has a diameter less than the diameter of said ball, and wherein said ball extends into said first groove when said collar is in said first position and extends into said second groove when said collar is in said second position.

20. The chuck as in claim 14, including a second sleeve disposed between, and rotationally fixed to each of, said first sleeve and said nut.

21. The chuck as in claim 20, wherein said second sleeve and said first sleeve are rotationally fixed to each other through interengaging axially aligned splines.

22. The chuck as in claim 14, wherein said nut is an annular one-piece member surrounding said body and retained in the axially forward direction on said body by an annular retainer attached to said nose section of said body and abutting an axially forward surface of said nut.

23. The chuck as in claim 20, wherein said second sleeve is pressed to said nut.

24. The chuck as in claim 15, wherein each said gap defines angular side surfaces that are slanted so that the angular width of said gap decreases from an end of said gap proximate said lug to an opposite end of said gap and so that, when said gaps receive said lugs, each said angular side surface is substantially parallel to an opposing angular side surface of a said lug received by said gap.

25. The chuck as in claim 24, wherein each said angular side surface of said gap defines an approximately 35° angle with respect to a line parallel to an axis of said gap.

26. The chuck as in claim 14, wherein said collar defines a central bore including at least one flat surface opposing a corresponding flat surface of said body to thereby rotationally fix said collar to said body.

27. A chuck for use with a manual or powered driver having a housing and a drive shaft rotatable with respect to said housing, said chuck comprising:

a generally cylindrical body, said body having a forward section and a rearward section, said rearward section having an axial bore formed therein to mate with said drive shaft of said driver and said forward section having an axial bore formed therein and a plurality of angularly disposed passageways formed therethrough and intersecting said forward section axial bore;

a plurality of jaws slidably respectively positioned in each of said angularly disposed passageways, each of said jaws having a jaw face formed on one side thereof and threads formed on the opposite side thereof;

a nut rotatably mounted relative to said body and engaging said jaws so that relative rotation between said nut and said body operates said jaws;

a first sleeve rotatably mounted on said body and rotationally fixed to said nut;

a second sleeve that is rotationally fixed to and axially movable with respect to said first sleeve; and a collar rotationally fixed to said rearward section of said body and axially movable with respect thereto, wherein said second sleeve defines an annular groove that receives said collar so that said collar and said second sleeve are rotatable with respect to each other and are axially fixed to each other so that said collar moves axially with said second sleeve with respect to said body between a first axial position and a second axial position, and wherein said collar is rotatable with respect to said housing in said first position and is rotationally fixed to said housing in said second position.

28. The chuck as in claim 27, wherein said collar defines a plurality of spaced apart gaps or spaced apart lugs so that when said collar is in said second position, said gaps or lugs interengage with the other of spaced apart gaps or lugs on said housing, and wherein each said gap defines angular side surfaces that are slanted so that the angular width of said gap decreases from an end of said gap proximate said lug to an opposite end of said gap and so that, when said gaps receive said lugs, each said angular side surface is substantially parallel to an opposing angular side surface of a said lug received by said gap.

29. The chuck as in claim 28, including a detent axially fixed to one of said second sleeve and said collar, wherein said detent engages said body when said collar is in said first position so that said collar is axially movable with respect to said body toward said second position upon application of an axial force between said collar and said body overcoming said detent, and wherein said detent engages said body when said collar is in said second position so that said collar is axially movable with respect to said body toward said first position upon application of an axial force between said collar and said body overcoming said detent.

30. A manual or powered driver, said driver comprising:

a housing;

a drive shaft rotatable with respect to said housing; and a chuck, said chuck including a generally cylindrical body, said body having a forward section and a rearward section, said rearward section having an axial bore formed therein to mate with said drive shaft of said driver, a nut rotatably mounted relative to said body so that relative rotation between said nut and said body moves said chuck toward an open or closed position, depending upon the direction of said relative rotation, a first sleeve rotationally fixed to said nut and rotatable and axially movable with respect to said body, and a collar disposed operatively between said first sleeve and said body, said collar being rotationally fixed to and axially movable with respect to said body and axially fixed to and rotatable with respect to said first sleeve so that said collar moves axially with said first sleeve with respect to said body between a first axial position and a second axial position, wherein said collar is rotatable with respect to said housing in said first position and is rotationally fixed to said housing in said second position.

31. The driver as in claim 30, wherein one of said collar and said housing defines a plurality of spaced apart axially aligned gaps and wherein the other of said collar and said housing includes a plurality of lugs that extend axially therefrom and that are received by respective said gaps when said collar is in said second position.

32. The driver as in claim 31, wherein said housing includes a forward section surrounding said spindle and removably secured to a main section of said housing and wherein one of said lugs and said gaps are defined by said forward section.

33. The driver as in claim 32, including a handle extending outward from said forward section.

34. The driver as in claim 33, wherein said forward section includes parallel plates, wherein said handle extends from a first said plate and wherein said one of said lugs and said gaps are defined on a second said plate.

35. The driver as in claim 30, wherein said body has a forward section having an axial bore formed therein and a plurality of angularly disposed passageways formed therethrough and intersecting said forward section axial bore, wherein said driver includes a plurality of jaws slidably positioned in respective said passageways, each of said jaws having a jaw face formed on one side thereof and threads formed on the other side thereof, and wherein said nut engages said jaws so that relative rotation between said nut and said body operates said jaws.

36. The driver as in claim 35, including a detent axially fixed to one of said first sleeve and said collar, wherein said detent engages said body when said collar is in said first position so that said collar is axially movable with respect to said body toward said second position upon application of an axial force between said collar and said body overcoming said detent, and wherein said detent engages said body when said collar is in said second position so that said collar is axially movable with respect to said body toward said first position upon application of an axial force between said collar and said body overcoming said detent.

37. The driver as in claim 31, wherein each said gap defines angular side surfaces that are slanted so that the angular width of said gap decreases from a first end of said gap to a second end of said gap and wherein each said lug defines angular side surfaces that are substantially parallel to said angular side surfaces of a said hole in which said lug is received so that relative rotational force between said collar and said housing, when said collar is in said second position, urges said collar to said first position.

38. The driver as in claim 37, wherein each said angular side surface of said gap defines an approximately 35° angle with respect to a line parallel to an axis of said gap.

39. The driver as in claim 31, wherein said collar defines said gaps and said housing defines said lugs.

40. A chuck for use with a manual or powered driver having a housing and a drive shaft rotatable with respect to said housing, said chuck comprising:

a generally cylindrical body, said body having a forward section and a rearward section, said rearward section having an axial bore formed therein to mate with said drive shaft of said driver;

a first sleeve rotationally mounted relative to said body so that ralative rotation between said first sleeve and said body moves said chuck toward an open or closed position, depending upon the direction of said relative rotation, whrein said first sleeve is axially movable with respect to said body; and a collar disposed operatively between said first sleeve and said body, said collar being rotationally fixed to and axially movable with respect to said body and axially fixed to and rotatable with respect to said first sleeve so that said collar moves axially with said first sleeve with respect to said body between a first axial position and a second axial position, wherein said collar is rotatable with respect to said housing in said first position and is rotationally fixed to said housing in said second position.

41. The chuck as in claim 40, wherein said collar defines spaced apart gaps or spaced apart lugs that interengage with the other of spaced apart gaps and spaced apart lugs on said housing when said collar is in said second position.

42. The chuck as in claim 41, wherein said collar defines a plurality of spaced apart gaps extending axially into said collar so that when said collar is in said second position, said gaps respectively receive a plurality of lugs extending axially forward from said housing toward said collar.

43. The chuck as in claim 40, including a detent axially fixed to one of said first sleeve and said collar, wherein said detent engages said body when said collar is in said first position so that said collar is axially movable with respect to said body toward said second position upon application of an axial force between said collar and said body overcoming said detent, and wherein said detent engages said body when said collar is in said second position so that said collar is axially movable with respect to said body toward said first position upon application of an axial force between said collar and said body overcoming said detent.

44. The chuck as in claim 41, wherein each said gap defines angular side surfaces that are slanted so that the angular width of said gap decreases from an end of said gap proximate said lug to an opposite end of said gap and so that, when said gaps receive said lugs, each said angular side surface is substantially parallel to an opposing angular side surface of a said lug received by said gap.

45. The chuck as in claim 40, wherein said collar defines a central bore including at least one flat surface opposing a corresponding flat surface of said body to thereby rotationally fix said collar to said body.

* * * * *